(No Model.) 4 Sheets—Sheet 3.
R. M. FRYER.
VALVE GEAR FOR ENGINES.
No. 527,679. Patented Oct. 16, 1894.
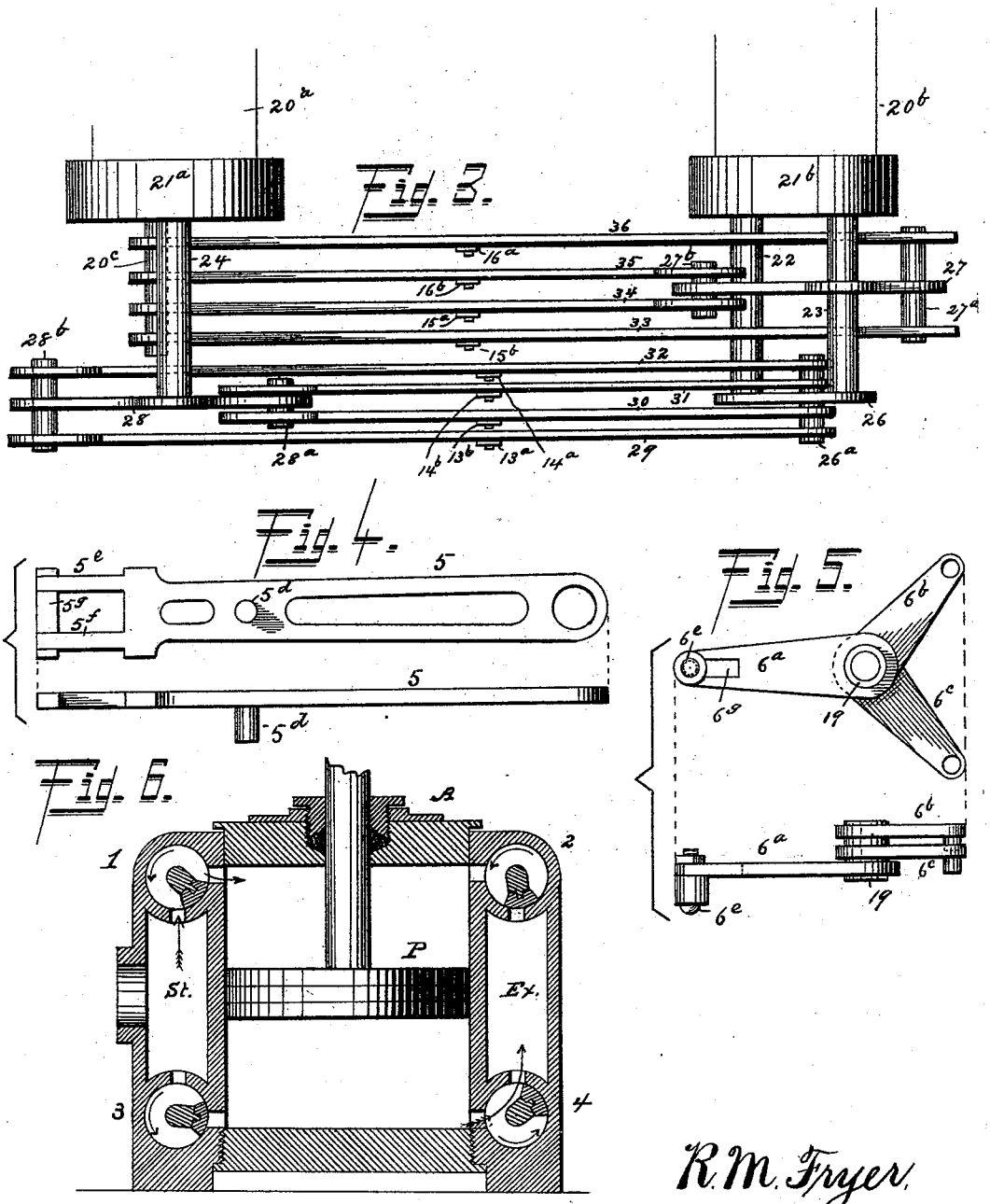
WITNESSES:
W. B. Lane
Jas. T. McClenahan
R. M. Fryer, INVENTOR,
BY D. B. Gallatin, ATTORNEY.

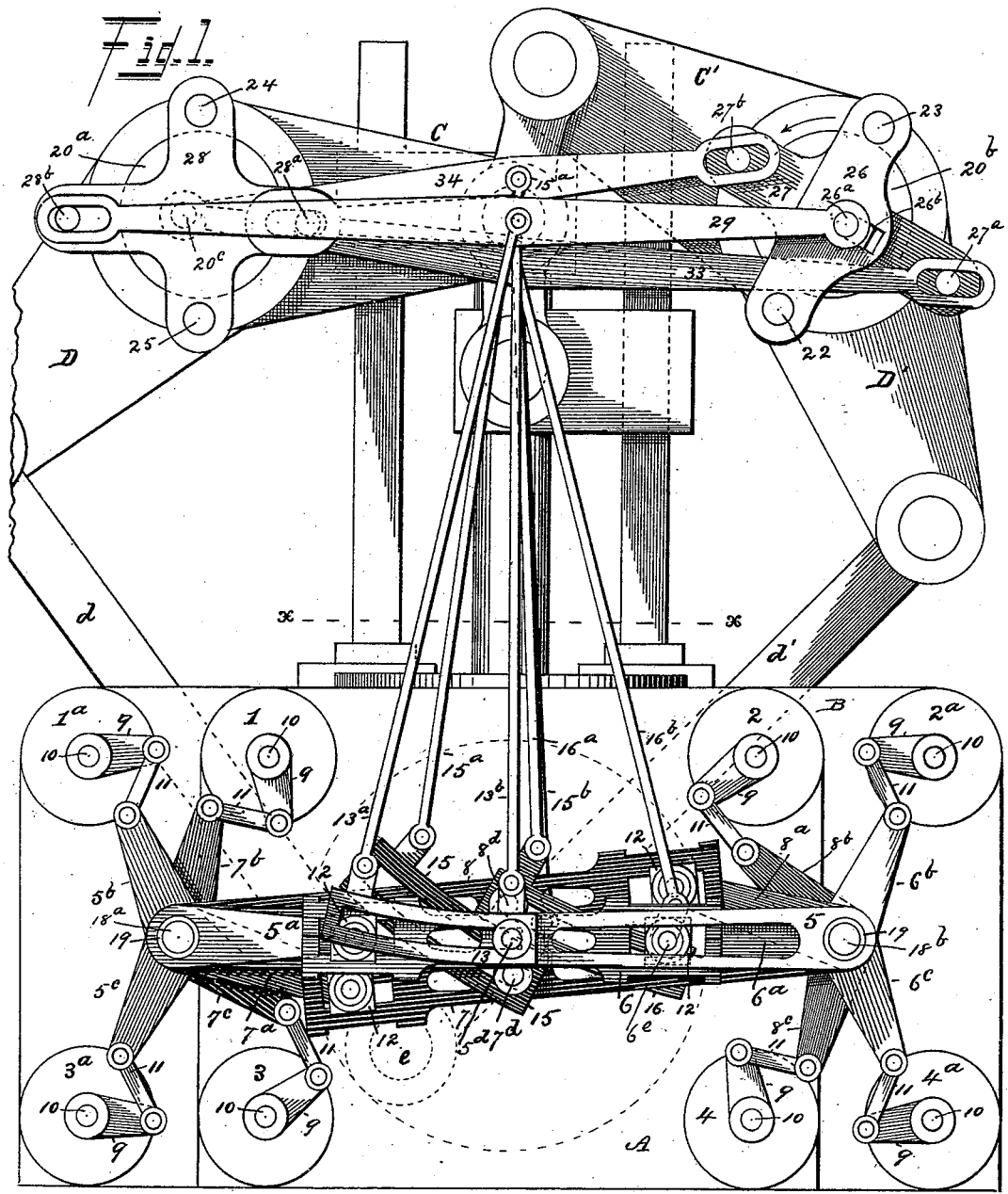

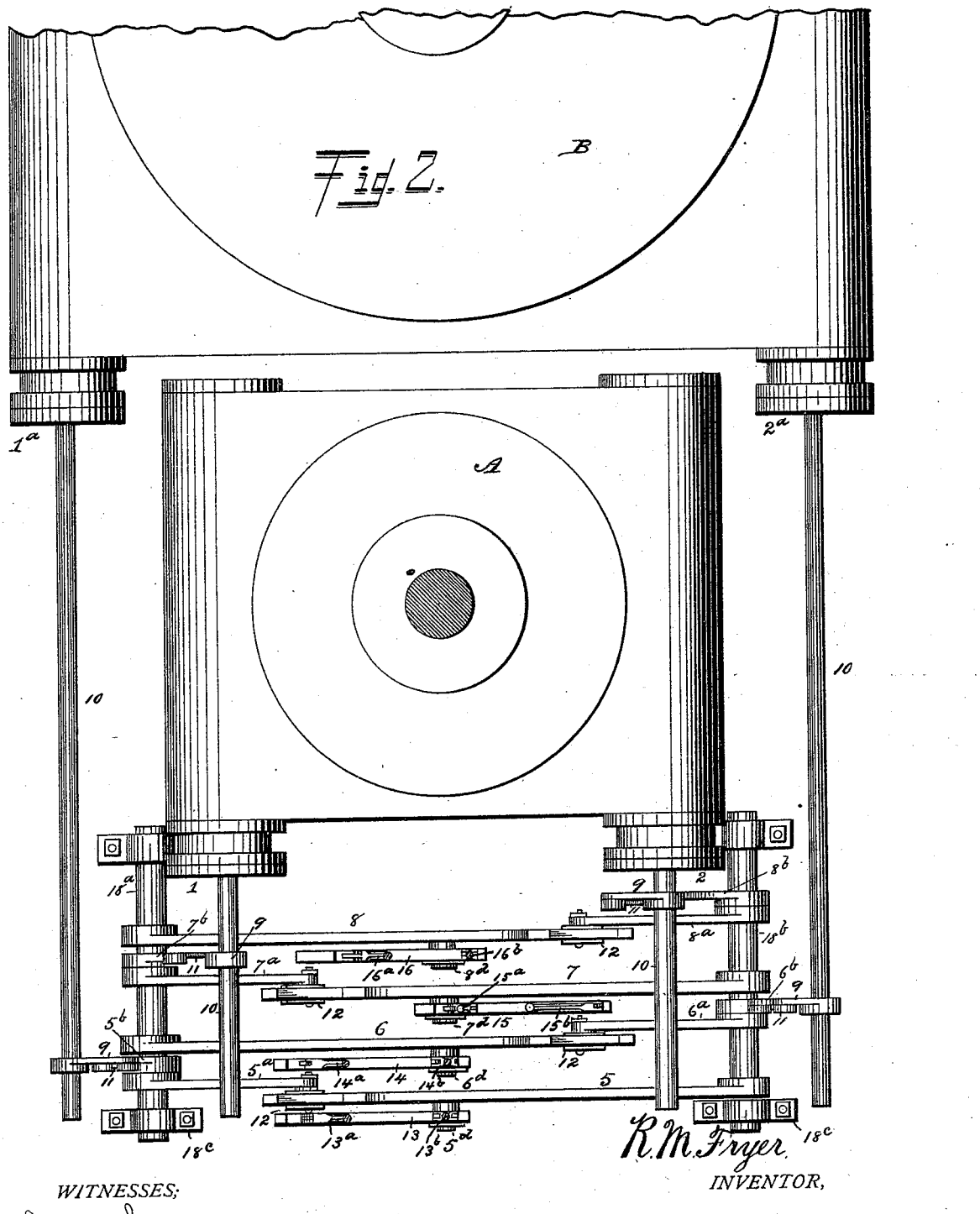

(No Model.) 4 Sheets—Sheet 4.
R. M. FRYER.
VALVE GEAR FOR ENGINES.
No. 527,679. Patented Oct. 16, 1894.
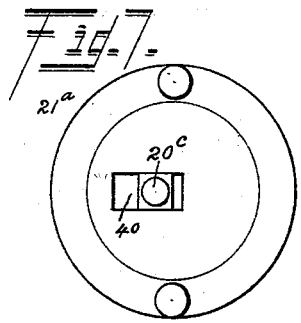
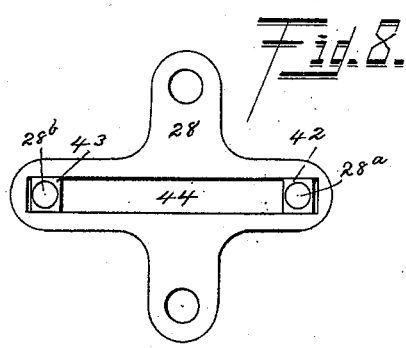
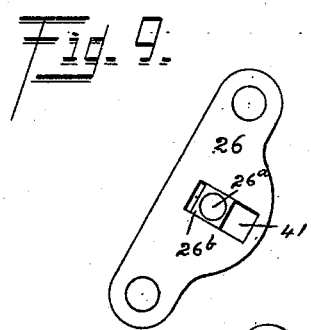
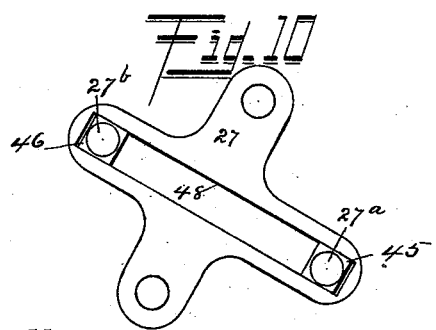
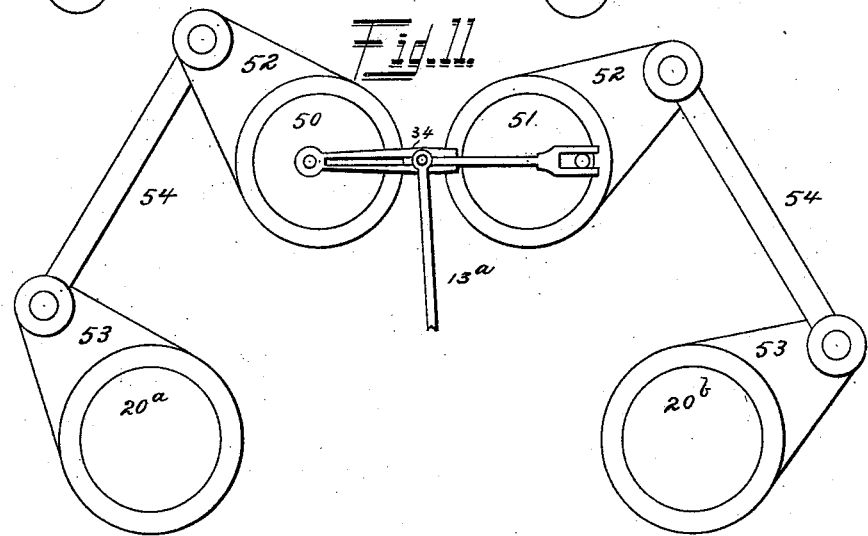
WITNESSES:
W. B. Lane
Jas. T. McClenahan
INVENTOR,
R. M. Fryer
BY
D. B. Gallatin
ATTORNEY.

UNITED STATES PATENT OFFICE.

ROBERT M. FRYER, OF WASHINGTON, DISTRICT OF COLUMBIA, ASSIGNOR TO J. P. V. RITTER, A. S. JOHNSON, C. H. BURGESS, WILLIAM C. AVERY, B. E. EMMERT, AND GEORGE H. LA FETRA, OF SAME PLACE.

VALVE-GEAR FOR ENGINES.

SPECIFICATION forming part of Letters Patent No. 527,679, dated October 16, 1894.

Application filed February 3, 1894. Serial No. 498,950. (No model.)

*To all whom it may concern:*

Be it known that I, ROBERT M. FRYER, a citizen of the United States, residing at Washington, in the District of Columbia, have invented certain new and useful Improvements in Valve-Gear for Steam-Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The objects of this invention are to avoid the use of eccentrics as a means for actuating valve gear; to take motion for actuating the valves directly from the moving parts of the engine to which they belong; to control the valves of one cylinder of a compound engine by, or from, the movable parts actuated by the other cylinder; to set the valves, by a preliminary or preparatory movement, to a predetermined position, and to open and close from said predetermined position by separate and independent movements; to move the valves with a differential movement, gradually increasing toward, and diminishing from, the closed position; to provide means for varying the throw of the valves; to provide means for varying the lead; and to actuate the valves by motion derived primarily from reciprocating parts of the engine in contradistinction to continuously rotating parts.

To these ends, the invention consists in the construction, arrangement, and combination of parts, as hereinafter fully described, and as illustrated in the accompanying drawings which form a part of this specification, and in which—

Figure 1 represents my valve gear in front elevation, showing its application to the engine. Fig. 2 is a plan view of the valve-operating arms and levers, showing their connection with the engine valves, the view being taken on the line $x, x$, in Fig. 1. Fig. 3 is a plan view of the actuating levers, showing their connection with the oscillating shafts of the engine. Fig. 4 represents, in face and edge view, one of the valve operating levers. Fig. 5 represents, in face and edge view, one of the crank levers. Fig. 6 is a vertical central section through the cylinder, valve chambers and valves, of a steam engine, showing the valves in their relative positions at a predetermined point in the movement of the piston. Figs. 7, 8, 9 and 10 represent details of construction hereinafter fully described. Fig. 11 shows a modified arrangement.

In the accompanying drawings, and in the following description, I show and describe the invention as being applied to rotary or oscillating valves, but I desire to have it understood that it is applicable to other styles of valves and that I do not intend to limit myself in its application to any particular style; and I desire also to have it understood that this valve gear is applicable to any right angular engine, and that its application is therefore not limited to the particular engine described in the Letters Patent heretofore granted to me as hereinafter stated.

A designates the high pressure, and B the low pressure cylinder, the piston of one cylinder being connected with a crank arm C on a rock shaft $20^a$ and that of the other cylinder with a corresponding arm C' on a rock shaft $20^b$, the said shafts $20^a$ and $20^b$ being parallel with each other. Said shafts are also provided with outwardly projecting arms D and D' which are both connected, by means of connecting rods $d, d'$, with a crank pin $e$ of the shaft to be driven. The arms D, D', stand at substantially right angles to each other, so that when the connecting rod actuated by one engine is at the center the other connecting rod is on the quarter, the said positions corresponding approximately with the full and half strokes of the respective pistons; from which it follows that each piston in its turn assists the other in passing the center, and that dead centers are entirely avoided. This engine forms no part of my present invention, but forms the subject of Letters Patent of the United States, granted to me on the 21st day of August, 1883, No. 283,704, and the foregoing description is given here merely for the purpose of aiding the following description of the valve gear.

From the front end of the shaft $20^a$ project horizontal pins or arms 24, 25, and from the end of shaft 20ᵇ extend similar pins or arms 22, 23, these pins or arms being conveniently formed on cap pieces 21ᵃ and 21ᵇ, which are secured in any suitable manner on the ends of the respective shafts. The pins or arms of the respective shafts are preferably diametrically opposite each other and so disposed that when the shafts are in their intermediate positions (as when the engines by which they are respectively actuated are on the half stroke) each pair of pins will be in the same vertical plane. This is for the purpose of permitting the actuating levers to extend from one shaft between the pins of the other, as will be hereinafter more fully explained. A third pin 20ᶜ projects from the shaft 20ᵃ slightly eccentric to the axis of the latter, being so disposed that when the shaft is in the central position, (as shown in Fig. 1) the pin will be in the same horizontal plane with, and outside of, the axis of the shaft.

A series of actuating levers, 33, 34, 35 and 36, are fulcrumed on the pin 20ᶜ and extend horizontally in the direction of the opposite shaft 20ᵇ. The two outer levers 33, 36, are longer than the inner ones 34, 35, and extend between the pins 22, 23. They are supported on a horizontal pin or bar 27ᵃ projecting on opposite sides of a disk or plate 27 mounted on the pins 22, 23, the said levers having in their ends elongated eyes for the reception of the supporting pin, whereby lost motion is provided for to permit the oscillations of shaft 20ᵇ.

The intermediate levers 34, 35, are supported on and controlled by, a horizontal pin 27ᵇ which also projects on both sides of the disk 27 diametrically opposite the pin 27ᵃ, so that by the oscillations of the shaft the levers connected with the respective pins 27ᵃ and 27ᵇ are alternately moved in opposite directions, one pair being raised and the other pair lowered. The levers being of different length the pins 27ᵃ and 27ᵇ are placed at such relative distances from the center of motion that the two pairs of levers shall be moved through corresponding angular distances,— that is to say, so that at corresponding distances from the fulcrum 20ᶜ they shall have the same vertical movement.

On the ends of the arms 22, 23 is a disk or plate 26 which carries a fulcrum pin 26ᵃ projecting from both sides (see Fig. 3), the said pin having the same relation to the axial line of the shaft 20ᵇ that the pin 20ᶜ has to that of shaft 20ᵃ. Four levers, 29, 30, 31, 32 are fulcrumed on the pin 26ᵃ, corresponding in length and arrangement with the levers 33 to 36, as above described, but extending in the opposite direction. The inner, and shorter, levers 30, 31, are supported and actuated by a cross-pin 28ᵃ carried by a disk or plate 28 mounted on the ends of the arms 24, 25, and the outer and longer levers by a pin 28ᵇ also carried by said disk or plate, the said pins 28ᵃ and 28ᵇ having the same relation to the axial line of shaft 20ᵃ that the pins 27ᵃ and 27ᵇ have to that of shaft 20ᵇ, as above described. Thus when the engines are in operation the oscillatory movements of the shafts 20ᵃ and 20ᵇ impart vibratory movements to the levers in pairs, one pair of each series being raised as the other pair is lowered.

The system of levers thus far described are the actuating levers from which the valve gear is operated, as will be hereinafter described.

In front, and at the sides, of engine A, are two rods or shafts 18ᵃ 18ᵇ secured by cap plates 18ᶜ upon any suitable supports (not shown), and on these rods or shafts are loosely mounted, in alternating arrangement, four lever-arms 5, 6, 7 and 8, constructed substantially as shown in Fig. 4, and four series of crank levers, constructed substantially as shown in Fig. 5, the crank levers on one shaft being in engagement with, and operated by, the lever-arms on the opposite shaft, as will be more fully explained.

Referring to Fig. 4, which represents in detached view the lever-arm marked "5" in Fig. 1, it will be seen that at the free end are two parallel arms 5ᵉ, 5ᶠ, bound together by a tie piece 5ᵍ, said arms forming a yoke for the reception of a sliding box 12 which receives the right angular boss on the end of the engaging crank-arm. Each set of cranks comprises three arms which may be integral with each other, or formed separately and united together, as may be found preferable by the mechanic.

In Fig. 5, (which represents the set of arms marked 6ᵃ, 6ᵇ and 6ᶜ in Fig. 1,) I show them formed separately and connected together by a sleeve 19 upon which they are rigidly secured, side by side, in proper angular relation to each other, the said sleeve having an internal diameter corresponding with the size of the shaft or rod 18ᵇ upon which it is mounted. The arm 6ᵃ, which is somewhat longer than the arms 6ᵇ, 6ᶜ, has at its end a right angular boss or stud 6ᵉ which engages the sliding box 12, as above stated, and forms the connection with the lever-arm 6 on the opposite supporting shaft 18ᵃ. The two arms 6ᵇ and 6ᶜ are arranged at corresponding opposite angles with relation to the arm 6ᵃ, as shown in Fig. 5. Preferably I make the boss or stud 6ᵉ movable, as indicated in Fig. 5, by setting it in a slot 6ᵍ. By adjusting it toward or from the axis of the arm 6ᵃ the leverage may be varied and the throw of the valves regulated.

While I have described only one lever-arm it will be understood that the four arms 5, 6, 7 and 8 are all alike, and of the same size, and that each arm controls one set of crank levers, the four sets being also alike, the several arms of each set being designated by corresponding reference marks.

1, 2, 3, 4 designate the valve chambers of the cylinder A, and 1ᵃ, 2ᵃ, 3ᵃ and 4ᵃ those of the cylinder B, the said chambers being disposed at top and bottom, and at opposite sides, of their respective cylinders. The valves within said chambers have projecting stems 10, each provided with a crank 9 rigidly fixed thereon, said cranks being coupled by means of links 11 with the crank-arms on the shafts $18^a$ and $18^b$, each set of crank-arms controlling two valves, as represented in Fig. 1. Thus, the valves in chambers $1^a$ and $3^a$ are controlled and operated by the crank-arms $5^a$, $5^b$ and $5^c$, these crank arms being in turn controlled and operated by the lever-arm 5; the valves in chambers $2^a$ and $4^a$ by the crank arms $6^a$, $6^b$, $6^c$, and lever-arm 6; those in chambers 1 and 3 by crank-arms $7^a$, $7^b$, $7^c$, and by lever-arm 7, and those in chambers 2 and 4 by crank-arms $8^a$, $8^b$, $8^c$ and lever arm 8. The arms 7 and 8, which control the valves in chambers 1, 2, 3, 4 being respectively in their depressed and elevated positions the valves stand in the relative positions indicated in Fig. 6, in which the steam ports, through which steam is admitted to the cylinder, are supposed to be at the left hand side, marked St. and the exhaust ports at the right hand side, marked Ex. the piston P being near the completion of its downward stroke.

During the downward stroke of the piston steam is admitted through the valve chamber 1, as indicated by arrows, the lower steam port being closed, and the exhaust is effected through the chamber 4, the valve in chamber 2 being closed. When the positions of the arms 7 and 8 are reversed, the valves controlled thereby will also be reversed, those in chambers 1 and 4 being closed and those in chambers 2 and 3 being opened, steam being then admitted through chamber 3 and exhausted through chamber 2. The connections for effecting these movements and reversals will now be described.

The arms 5, 6, 7, 8 are provided respectively at corresponding points in their lengths with horizontally projecting studs $5^d$, $6^d$, $7^d$ and $8^d$, and on the respective studs are links 13, 14, 15 and 16, which are connected with the actuating levers 29 to 36, by link rods, as represented in Fig. 1, each link being connected with two levers. Thus, under the arrangement illustrated in the drawings link 13 is connected by link rods $13^a$ and $13^b$, with levers 29, 30; link 14, by rods $14^a$ and $14^b$ with levers 31, 32; link 15 by rods $15^a$ and $15^b$ with levers 33, 34, and link 16, by rods $16^a$ and $16^b$ with levers 35 and 36, each link being thus connected with one long and one short lever of the same series, from which it follows that as the said levers are vibrated, as above explained, one end of each link will be raised and the other end lowered, and the lever bars on which the respective links are mounted will thus also be raised and lowered, the amount of vertical movement so imparted to the levers being regulated by the position of the links, as usual in link motions.

While in the drawings I show no means for shifting the links, it will of course be understood that they are to be shifted as circumstances may require, and that any ordinary or appropriate shifting mechanism may be employed.

The operation of the mechanism thus described is as follows: The parts being in the position indicated in the drawings,—the high pressure piston at the half stroke on the downward movement, and the low pressure piston at the beginning of the downward stroke,—the series of actuating levers 29, 30, 31, 32, the two lever-arms 5, 6, and the valves controlled thereby will all stand in an intermediate position, the valves in chambers $2^a$ and $3^a$ being then at the beginning of their opening movement and those in the chambers $1^a$ and $4^a$ at the end of their closing movement; or, to be more exact, the opening movement of the valves in chambers $2^a$ and $3^a$ will already have commenced, for by reason of the eccentricity of the fulcrum pin $26^a$ the right hand ends of the levers 29, 30, as viewed in Figs. 1 and 3 will have passed below the central position when the opposite or left hand ends are in the central position, so that the opening movement of the valves from their central position commences at the instant when the pin $26^a$ passes the horizontal center. The valves are of greater width than the ports, so that in their central positions they overlap both sides of the ports, and they are,—or should be,—so adjusted that they will stand in their central positions when the pin $26^a$ is in its central position, or in the same horizontal plane with the axis of the shaft $20^b$; and the eccentricity of the pin $26^a$ is such that when the latter is in its lowest position, as indicated in Fig. 1, the steam and exhaust valves will have moved the distance of their lap to the point where the admission of steam for the opposite or return stroke begins. The shaft $20^b$ having now reached the limit of its movement, the movement in the opposite direction, indicated by the arrow in Fig. 1, begins, the effect of which, provided the shaft $20^a$ were at rest, would be to return the valves to the positions from which they were moved by the preceding oscillatory movement of shaft $20^b$, but the shaft $20^a$, being now in its central position and moving in the direction of said preceding movement of shaft $20^b$, it follows, by reason of the greater distance of the pins $28^a$ and $28^b$ from the center of motion that the left hand ends of the actuating levers will be depressed faster than the right hand ends are raised, so that the central points, at which the link rods are connected, will still move downward, continuing the movement of the valves until they are fully opened, the opening movement continuing until, and being completed when, the shaft $20^a$ reaches the limit of its movement.

It is to be noted that while the shafts $20^a$ and $20^b$ perform their oscillatory movements at a uniform rate of speed, and the pins $28^a$ and $28^b$ move through equal angular distances in equal times, the said pins travel, in a vertical direction from either limit of angular movement toward the central position, indicated in Fig. 1, at a constantly increasing rate of speed, and from the central position in either direction at a constantly diminishing rate of speed. Therefore, the valves being on the point of opening or closing when the said pins are in the central position they are opened and closed with a quick sharp movement, giving a practically instantaneous action, the effect of which cannot fail to be appreciated by engineers.

The above description relates to the valves of cylinder B actuated through levers 29, 30, 31, 32, lever arms 5 and 6, and crank arms $5^a$ and $6^a$. The valves of cylinder A are actuated in the same manner through levers 33, 34, 35, 36, lever-arms 7 and 8, and crank-arms $7^a$ and $8^a$, but the piston of cylinder B being at the limit of its upward stroke, ready to begin the return stroke and its valves respectively at the opening and closing points, the piston P of cylinder A, will be at the half stroke, and its valves at the limit of their movement in one direction, those in chambers 1 and 4 being fully open and those in chambers 2 and 3 fully closed, the said valves being then ready to begin their movements in the directions indicated by the arrows. These valves being actuated from shaft $20^b$, as soon as the latter begins its movement in the direction indicated by the arrow in Fig. 1 the levers 33, 34, and the lever-arms 7 and 8 will be respectively raised and lowered, the initial movements being comparatively slow and the rate of movement gradually increasing toward the central position, as above described with reference to the levers 29 to 32, and the lever arms 5 and 6.

The valves being considerably wider than the ports which they control will, by reason of the differential movement of the actuating mechanism, start slowly and travel with a gradually accelerating movement toward their new or reversed positions. The valves in chambers 1 and 4, being now fully open, move gradually toward their respective ports and close the same, the final closing movement being effected as the pins $27^a$ and $27^b$ near the central point in their travel from one position to the other and when they are moving at their highest rate of speed, and at the same time the valves in chambers 2 and 3 are opened by corresponding movements.

It will be understood from the foregoing that each shaft imparts to the valves of the cylinder from which it is actuated the initial or preparatory motion by which they are set to the positions where the active movements begin, and that the active operations of admitting and cutting off steam are effected from the opposite shaft, so that the valves of each cylinder are partly controlled by both shafts, being first set to a preparatory position by the shafts actuated by their own cylinders, and then opened and closed through connections with the other shaft. By varying the eccentricity of the pins $20^c$ and $26^a$ the extent of the initial or preparatory movements of the valves may be varied and varying lap provided for, and for this purpose I mount said pins in movable blocks $26^b$ adapted to be adjusted toward and from the axial line of the shafts in radial slots 40, 41, formed respectively in the cap piece $21^a$ and the plate 26, as illustrated in Figs. 7 and 9; also, by adjusting the pins $27^a$, $27^b$ and $28^a$, $28^b$ a greater or less angular movement may be imparted to the actuating levers, and consequently the throw of the valves may be varied at will to give the cylinders more or less steam, as circumstances may require.

In Fig. 8, I show the pins $28^a$ and $28^b$ supported by blocks 42, 43 adjustable toward and from the center in a slot or way 44 formed in the plate 28.

In Fig. 10 I show the pins $27^a$ and $27^b$ similarly mounted in blocks 45, 46, which are adjustable in a slot or way 48, formed in plate 27.

I do not wish to be understood as limiting myself to the exact details of construction shown and described, because to the skilled mechanic and engineer many changes and modifications will readily suggest themselves, and I therefore desire to have my claims construed to cover and include any mere modification, adapted to accomplish the same results in substantially the same way. For example, I may dispense with the reversing links and with one half of the actuating levers 29, &c., and connect the remaining levers directly with the respective lever-arms 5, 6, 7, 8, then by shifting the pins $27^a$, $27^b$, $28^a$ and $28^b$, or such of said pins as the remaining levers may be connected with, to the opposite sides of the axes of the respective shafts $20^a$ $20^b$, as explained with reference to Figs. 8 and 10, the direction of movement of the levers relatively to the direction of movement of the shafts being thereby reversed, whereby the engine will also be reversed without the use of reversing links.

In large engines, where the shafts are far apart and where by reason of the distance between them it is impracticable, under the arrangement above described, to impart to the actuating levers sufficient vibratory or angular movement to give the valves the required throw; or where the required space is not available between the said shafts, a construction and arrangement substantially such as illustrated in Fig. 11 may be adopted.

50, 51, designate two counter-shafts provided with crank arms 52, which are coupled with similar cranks 53 on the shafts $20^a$, $20^b$ by connecting-rods 54, so that the oscillations of the last named shafts impart similar movements to the counter-shafts. The counter-shafts may be located relatively to the shafts $20^a$, $20^b$, as may be preferred or found expedient. In the drawings I show them above, and between, but they may be located below and between, or in the same horizontal plane, as will be readily understood. The actuating levers 34, &c., instead of being connected with the engine shafts 20ª, 20ᵇ, as above described, and as illustrated in Figs. 1 and 3, are connected in the same manner with, and actuated by, the counter-shafts 50, 51. The counter-shafts may be located at such distance apart as may be found desirable or expedient. The closer they are together the shorter will be the levers, and the greater the angular or vibratory movements imparted to the latter.

By making the crank arms 52, 53 of different lengths the extent of the rotary movements imparted to the counter shafts may be varied. In Fig. 11 I represent an extensible actuating lever (marked 34) made in two parts 54, 55, telescoped together, whereby the shifting of the pins 27ª, &c., is provided for.

Having thus described my invention, I claim—

1. In a valve gear the combination with the valve, of an actuating lever, means for imparting vibratory movements alternately to the respective ends of said lever, and a connection between the valve and lever at an intermediate point in the length of the latter.

2. In a valve gear for steam engines the combination with the valve, of an actuating lever, two alternately reciprocating devices so connected with the respective ends of said lever as to impart unequal vibratory movements thereto, and a connection uniting the valve with the lever between said reciprocating devices.

3. In a valve gear for steam engines the combination of two parallel oscillating shafts, a lever having fulcra on said shafts eccentric to the axes thereof, a valve, and a connection between the valve and lever at a point between said shafts.

4. In a valve gear for steam engines the combination with the valve, of an actuating lever, means for imparting independent vibratory movements to the respective ends of said lever, and a reversing mechanism between the valve and lever at an intermediate point in the length of the latter.

5. In a valve gear the combination with the valves, of a plurality of actuating levers, two alternately or successively reciprocating devices connected respectively with opposite ends of said levers to impart unequal vibratory or angular movements thereto, each end of each lever moving on the connection at the opposite end as a center, and connections between intermediate points in the lengths of said levers and the valves for imparting motion to the latter.

6. In a valve gear the combination with the valves, of two successively or alternately reciprocating devices, a plurality of levers having their opposite ends connected with the respective reciprocating devices to receive unequal vibratory or angular movements therefrom, and link connections between said levers and the valves.

7. In a valve gear the combination of two rotary reciprocating shafts, a series of levers having their opposite ends connected with the respective shafts, the connections being at different distances from the respective centers of motion; whereby unequal vibratory movements are imparted to the respective ends of the levers, and connections between the valves and levers at intermediate points between the said shafts.

8. In a valve gear the combination of two rotary reciprocating shafts, a series of levers having fulcra on one of said shafts at points eccentric to its axis, and having connections with the other shaft at relatively greater distances from its axis, whereby unequal vibratory or angular movements are imparted to the two ends of said levers, and connections between the valves and levers at points between said shafts.

9. In a valve gear the combination of two rotary reciprocating shafts, a series of levers having fulcra on one shaft eccentric to the axis thereof and connected in pairs with the other shaft at opposite sides of its axis, whereby the reciprocating movements of the shafts will impart motion to the fulcrumed ends of all the levers in the same direction and to the opposite ends of the respective pairs in opposite directions, and connections between said levers and the valves for operating the latter.

10. In a valve gear the combination of two rotary reciprocating shafts, a series of levers having fulcra on one of said shafts, and having connection with the opposite shaft, in pairs, on opposite sides of its axis, said connections being adjustable toward and from the axis, whereby the throw of the levers may be varied and adjusted, and connections between said levers and the valves for operating the latter.

11. In a valve gear the combination of two rotary reciprocating shafts, a series of levers having fulcra on one of said shafts eccentric to its axis on the side opposite the other shaft and having connections with the opposite shaft, in pairs, on opposite sides of its axis, said connections being adjustable toward and from the axis, whereby the throw of the levers may be varied and adjusted, and connections between said levers and the valves for operating the latter.

12. In a valve gear the combination with the valves, of two rotary reciprocating shafts, a series of levers having fulcra on one shaft eccentric to the axis thereof, a second series of levers similarly fulcrumed on the other shaft, said levers being connected, in pairs, with the opposite shafts at opposite sides of the axes thereof, whereby the reciprocations of the shafts will move the fulcrumed ends of either series of levers in the same direction and the opposite ends of the respective pairs in opposite directions, and connections between said levers and the valves for operating the latter.

13. In a valve gear for compound engines the combination with the valves, of two rotary reciprocating shafts connected with, and operated by, the pistons of the respective cylinders, a series of levers having their fulcra on one shaft eccentric to the axis thereof, a second series of levers similarly fulcrumed on the other shaft, the said levers connected, in pairs, with the opposite shafts at opposite sides of the axes thereof, connections between one series of levers and the valves of one cylinder, and similar connections between the other series and the valves of the other cylinder, substantially as shown and described.

14. In a valve gear for compound engines the combination of two rotary reciprocating shafts connected respectively with, and operated by, the pistons of two cylinders, connections between each of said shafts and the valves of the cylinder connected with the other shaft for setting the valves to predetermined positions preparatory to their opening and closing movements, and connections between the valves of each cylinder and the shaft controlled by the piston of said cylinder for imparting to the valves their final opening and closing movements.

15. The combination with the valves, of the crank arms connected therewith, the vibrating lever arms operatively connected with the crank arms, for operating the same, the rotary reciprocating shafts, the actuating levers connected with and operated by said shafts, connections between said levers and lever arms, and connections between the shafts and the engine pistons.

16. In a valve gear for compound engines, the combination with the valves, of two rotary reciprocating shafts connected with, and actuated by, separate pistons, a series of levers having a common fulcrum on one of said shafts eccentric to the axis thereof and adjustable toward and from said axis, a second series similarly fulcrumed on the other shaft, each series of levers being coupled with the opposite shaft, the connections being adjustable from one side of the axis to the other connections between one series of levers and the valves of one cylinder, and similar connections between the other series and the valves of the other cylinder.

17. In a valve gear for double cylinder, right angular engines the combination with the valves, of two rotary reciprocating shafts connected with, and operated by, the respective pistons, a system of levers eccentrically connected with both shafts, the eccentricity of the connection with one shaft being greater than that with the other, and link mechanisms between said levers and valves.

18. In a valve gear for double cylinder, right angular engines the combination with the valves, of two rotary reciprocating shafts connected with, and actuated by, the pistons of the respective cylinders, a system of levers connected with both shafts, the connections with one shaft being adjustable toward and from the axis and the connections with the other shaft being adjustable from one side of the axis to the other, and connections between said levers and valves, whereby compound movements are imparted for first setting the valves to predetermined intermediate positions, and then opening and closing from said intermediate positions, and whereby the valves are adapted to be reversed by shifting said connections, as shown and described.

19. In a valve gear for compound right-angular engines the combination with the valves, of two rotary reciprocating shafts connected with, and operated by, the respective pistons, a series of levers fulcrumed on one shaft eccentric to the axis thereof, a second series similarly fulcrumed on the other shaft, said levers being connected with the opposite shafts, in pairs, at opposite sides of the axes thereof, the fulcrum on either shaft and the connections with the opposite series of levers being so arranged that they will be in line with the axis of the other shaft when the piston is on the half stroke.

20. The combination with the valves, the rotary reciprocating shafts and the actuating levers connected with, and operated by said shafts, of the lever-arms, the crank-arms connected with the valves and with the lever-arms, and reversing links between the actuating levers and the lever-arms, substantially as shown and described.

In testimony whereof I affix my signature in presence of two witnesses.

ROBT. M. FRYER.

Witnesses:
 W. B. LANE,
 D. B. GALLATIN.